United States Patent Office 3,057,853
Patented Oct. 9, 1962

3,057,853
ETHYL CELLULOSE PHTHALATE TRIMELLITATE AND ITS PREPARATION
Carlton L. Crane, Rochester, N.Y., assignor to Eastman Kodak Company, Rochester, N.Y., a corporation of New Jersey
No Drawing. Filed Mar. 31, 1961, Ser. No. 99,671
2 Claims. (Cl. 260—226)

This invention relates to ethyl cellulose phthalate trimellitate and its preparation by the incorporation of some trimellitic anhydride in an esterification bath ordinarily used for the phthalylation of ethyl cellulose.

Ethyl cellulose phthalate is useful particularly for coatings which are to be removed at some subsequent time by treatment thereof with an alkaline solution. Often difficulties are encountered in the removal of ethyl cellulose phthalate layers because the alkali solubility thereof is not that desired.

In certain types of photographic products it is desirable to employ a layer of ethyl cellulose phthalate as an overcoating to protect against dirt and fingerprints. After the desired handling of the photographic product, the ethyl cellulose phthalate layer may be removed by immersion in alkaline solution. However, under many conditions the removal of this layer is not entirely satisfactory. For instance, under certain conditions, such as in the use of wash water with a high hardness content or a high ambient temperature, portions of the layer may tend to stick thereto as specks or clumps. Removal of this material may involve additional treatment which may be expensive or inconvenient.

The solubility of ethyl cellulose phthalates in dilute alkali increases with increase in the combined phthalyl content, but this is not convenient particularly when the commercially available cellulose ethers are used as starting material for their preparation. If however ethyl cellulose having lower ethoxyl and consequently higher hydroxyl content is employed as the starting material in making ethyl cellulose phthalates, improved alkali solubility is obtained. Ethyl celluloses with low ethoxyl content are expensive and difficult to manufacture.

One object of my invention is to provide ethyl cellulose esters which, although prepared from readily available cellulose ethers, have good alkali solubility. Another object of my invention is to provide cellulose compounds which not only are alkali soluble but also exhibit a wide compatability with waxes. Other objects of my invention will appear herein.

I have found that ethyl cellulose esters may be prepared from ethyl celluloses having a 45–49% ethoxyl content (averaging .45–.75 esterifiable hydroxyls per C₆ glucose unit) and yet have improved solubility characteristics in dilute aqueous alkali even at higher temperatures. I have found that products having these characteristics also exhibit wide compatability with waxes. These products are obtained by esterifying ethyl cellulose so as to impart both phthalyl and trimellityl groups thereto. This is accomplished by including trimellitic anhydride in an esterification bath such as has been known previously in the prior art as suitable for the phthalylation of ethyl cellulose. For example, products can be prepared with almost any desired degree of alkali solubility by the addition of a controlled amount of trimellitic anhydride to reaction baths of the types described in U.S. Patents No. 2,352,261 of Hiatt and Emerson and No. 2,753,339 of Crane, when used for the esterification of ethyl celluloses containing 45–49% ethoxyl content.

To obtain alkali solubility it is desirable that the trimellitic anhydride be present in an amount to impart at least approximately 0.5% of trimellityl to the resulting product, thereby obtaining a product which will dissolve to form a clear solution at 5% concentration in 1% aqueous sodium carbonate at room temperature. With lesser amounts of trimellityl variation in alkaline solubility may be obtained. The ethyl cellulose phthalate trimellitates of the invention may range from those containing but a small proportion of trimellityl up to those containing 28% trimellityl and 1% phthalyl. However, those esters are preferred in which the amount of phthalyl is at least equal to that of the trimellityl. Ordinarily the ethyl cellulose phthalates of a viscosity such as 5 cps. or more are poorly soluble in aqueous alkali solutions at room temperature, cooling being desirable to improve solubility. Lowered viscosity improves the alkali solubility but this involves loss of film properties. However, in the case of the ethyl cellulose phthalate trimellitates having a viscosity of at least 5 cps., even as little as 0.5% combined trimellityl therein insures good solubility in dilute aqueous alkali without any need of cooling.

Ethyl cellulose phthalate trimellitates are useful for alkali-removable protective coatings, particularly on photographic products. In some cases a protective layer may be desired which is only soluble in alkali under certain conditions. In those cases the percentage of trimellitate and the viscosity may be adjusted to impart the desired solubility characteristics. In other cases ethyl cellulose phthalate trimellitate may be desired exhibiting alkali solubility under almost all conditions. It is products of this type which are of special interest, particularly those products which have at least approximately 0.5% combined trimellityl therein up to those in which half of the total combined acyl may be trimellityl, the remainder of the acyl being phthalyl.

The following examples illustrate my invention:

Example 1

813 parts of ethyl cellulose, having an ethoxyl content of 46.2%, a viscosity of 7.3 cps. at 5% concentration in toluene-ethanol at 25° C., and a moisture content of 1.5%, were placed in a jacketed sigma bladed mixer, together with 87 parts of acetic anhydride, 200 parts of anhydrous sodium acetate and 1200 parts of acetic acid. The mass was stirred for 5 minutes and the temperature was allowed to rise to 140° F. during this time. There was then added to the mass 31 parts of trimellitic anhydride and agitation was continued for 15 minutes. Then 936 parts of phthalic anhydride and 600 parts of sodium acetate were added and the temperature was raised to 184° F. The mass was stirred for 5 hours, at the end of which time the reaction was considered as complete.

At the end of this time cooling water was passed through the jacket of the mixer while 3,000 parts of 50° F. distilled water were added to the mass. Agitation was continued until the reaction mass precipitated in the form of a fine powder. This powder was transferred to a comminutor, ground to uniform particle size and was washed in successive changes of distilled water at 130° F. until substantially free of uncombined acids. Drying was conducted at 160° F. The product had the following characteristics:

Combined phthalyl_____ 19.1%.
Combined trimellityl_____ 1.6%.
Viscosity at 3% concentration in ehanol/isopropanol/n - butanol 7:2:1 at 25° C._____ 5.3 cps.
Solubility in 1% sodium carbonate solution at 5% concentration___ Soluble and clear at room temperature.

Example 2

The preceding example was repeated except that 62.5 parts of trimellitic anhydride and 912 parts of phthalic anhydride were used. The product obtained was analyzed with the following results:

| | |
|---|---|
| Combined trimellityl | 3.4%. |
| Combined phthalyl | 18.9%. |
| Viscosity in ethanol/isopropanol/n-butanol (7:2:1) at 25° C. in solution at 3% concentration | 5.0 cps. |
| Solubility in 1% sodium carbonate at 5% concentration | Soluble, forming a clear solution at room temperature. |

Example 3

8.1 parts of ethyl cellulose of the same type as used in Example 1 but containing 1% of moisture were mixed in a jacketed sigma bladed mixer with 12 parts of acetic acid and 0.7 part of acetic anhydride, during which time the mass was stirred for 5 minutes, its temperature being raised to 120° F. 2.6 parts of trimellitic anhydride were then added and the mass was stirred and heated for 15 minutes to a temperature of 149° F. The stirring was continued while 7.6 parts of phthalic anhydride and 6 parts of anhydrous sodium acetate were added and the temperature was raised to 180° F. The mass was stirred and heated for 5 hours, at the end of which time the reaction was considered as complete. Cooling water was then circulated through the jacket of the mixer while 30 parts of 40° F. distilled water were added to the mass. Stirring was continued until a uniform fine powder was obtained. This product was washed in successive changes of distilled water having a temperature of 130° F. until substantially free of uncombined acid, whereupon it was dried at 150° F. The product obtained had the following analysis:

| | |
|---|---|
| Combined trimellityl | percent 12.1 |
| Combined phthalyl | do 13.5 |
| Viscosity in ethanol/isopropanol/isobutanol 7:2:1 at a temperature of 25° C. and at a concentration of 3% | cps 5.4 |

The product was soluble at 5% concentration in 1% aqueous sodium carbonate to give a clear solution at room temperature.

The products obtained in the various examples were all useful as coating materials to impart layers to various products which were easily removable by dilute alkaline solutions, such as sodium carbonate of 1% concentration or sodium hydroxide of .25% concentration. These products were useful as overcoatings for photographic products which in their processing were treated in processing solutions having a pH above 5.

I claim:

1. Ethyl cellulose phthalate trimellitate.
2. A method of making alkali soluble products from ethyl cellulose having an ethoxyl content of 45–49%, which comprises esterfying said cellulose ether with an esterfication mixture containing both phthalic anhydride and trimellitic anhydride as esterfication reagents therein in proportions such that the resulting product contains chemically combined therewith at least 0.5% trimellityl and at least 1% phthalyl.

References Cited in the file of this patent

UNITED STATES PATENTS

| | | |
|---|---|---|
| 2,069,974 | Schulze | Feb. 9, 1937 |
| 2,352,261 | Hiatt et al. | June 27, 1944 |
| 2,753,339 | Malm et al. | July 3, 1956 |
| 2,759,925 | Hiatt et al. | Aug. 21, 1956 |
| 2,768,161 | Malm et al. | Oct. 23, 1956 |
| 2,794,799 | Hiatt et al. | June 4, 1957 |